Sept. 15, 1925

W. KOHR

DEVICE FOR FILLING THE MILK SUPPLY RECEPTACLES OF MILK BOTTLE
FILLING MACHINES

Filed Nov. 7, 1924

1,553,385

William Kohr,
Inventor

Patented Sept. 15, 1925.

1,553,385

UNITED STATES PATENT OFFICE.

WILLIAM KOHR, OF JOHNSTOWN, PENNSYLVANIA.

DEVICE FOR FILLING THE MILK-SUPPLY RECEPTACLES OF MILK-BOTTLE-FILLING MACHINES.

Application filed November 7, 1924. Serial No. 748,421.

*To all whom it may concern:*

Be it known that I, WILLIAM KOHR, a citizen of the United States, residing at Johnstown, in the county of Cambria and State of Pennsylvania, have invented certain new and useful Improvements in Devices for Filling the Milk-Supply Receptacles of Milk-Bottle-Filling Machines, of which the following is a specification.

This invention relates to improvements in a milk bottle filling machine and has reference more particularly to a device for filling the supply receptacles thereof.

One of the important objects of the present invention is to provide a device of the above mentioned character, which will prevent the formation of foam during the filling of the supply receptacle.

Another important object of the invention is to provide a device of the above mentioned character, wherein means is associated with the discharge end of the filling tube for controlling the discharge of the fluid from the pipe into the receptacle.

A further object of the invention is to provide a device of the above mentioned character, which may be readily and easily attached in position, the same being simple in construction, inexpensive, strong and durable and furthermore adapted for the purposes for which it is designated.

Other objects and advantages of this invention will become apparent during the course of the following description.

In the accompanying drawing forming a part of this specification and in which like numerals designate like parts throughout the same:

Figure 1:
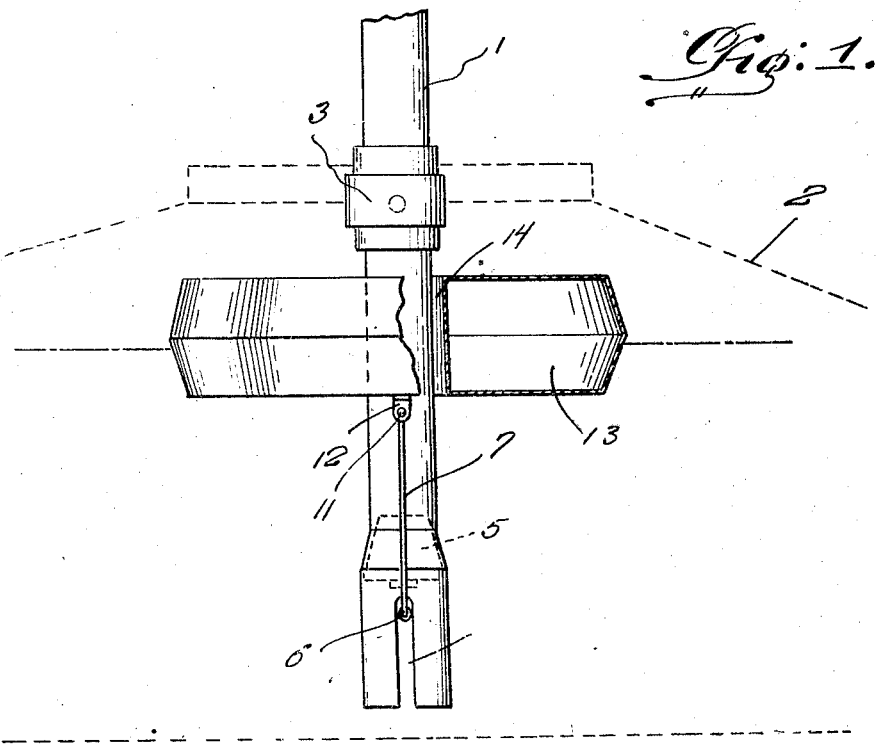
Figure 1 is a side elevation of my invention showing the same in position.

In the drawing, wherein for the purpose of illustration is shown the preferred embodiment of my invention, the numeral 1 designates a portion of a filling tube, the lower portion thereof being adapted to extend vertically through the top of a milk receiving or supply receptacle designated generally by the numeral 2 so that the lower or discharge end of the filling tube terminates at a point adjacent the bottom of the receptacle 2. The upper end of the tube is adapted to be connected with a suitable source of supply (not shown). A rubber gasket 3 is associated with the filling tube and slidably cooperates with the opening in the top of the receptacle through which the tube extends to adjust the same to the position of the receptacle.

The lower end of the filling tube 1 is provided with the diametrically opposed longitudinally extending slots 4 and any number of these slots may be provided for facilitating the discharge of the milk from the tube into the bottom of the receptacle 2. The purpose of having the discharge end of the filling tube 1 extending downwardly into the pan or receptacle 2 so that the same terminates at a point adjacent the bottom thereof is to prevent the milk from foaming as usually results when the milk is discharged into the receptacle at the top. It is well known in the art that when foam is generated in the receptacle, the filling of the milk bottles is interfered with and considerable time is consumed in properly filling the milk bottles. As the manner in which the milk is supplied from the receptacle 2 to the milk bottles which travel underneath the same is well known and as the same further forms no important part of the present invention, a further detailed description thereof is not thought necessary.

Figure 2:
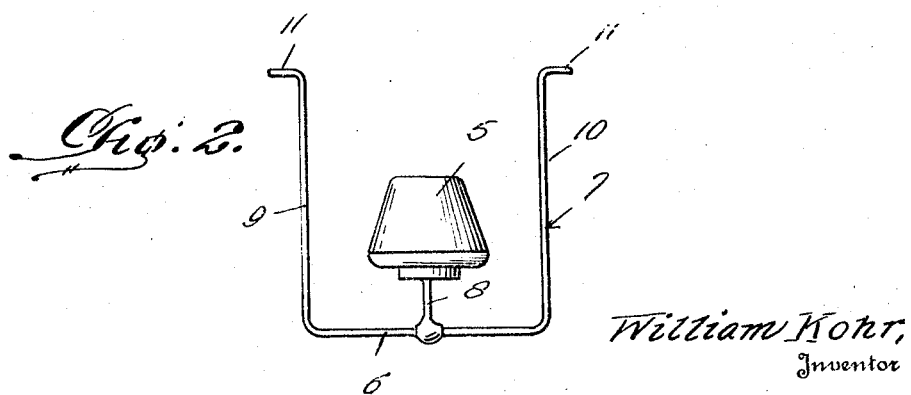
Figure 2 is a detail view of the valve and the float supported member.

For controlling the discharge of the milk from the filling tube into the receptacle, I provide a valve 5 which is disposed in the lower portion of the filling tube and the same is supported on the crown portion 6 of a substantially U-shaped wire member 7 in the manner as shown at 8 with reference more particularly to Figure 2 of the drawing. The valve 5 is further supported on the crown or base portion 6 of the U-shaped member 7 intermediate the arms 9 and 10 thereof, the ends of the base portion extending outwardly through one pair of diametrically opposed slots 4 so that the arms 9 and 10 of the U-shaped member extend on opposite sides of the lower portion of the filling tube. The upper ends of the arms are disposed laterally as illustrated at 11 for cooperation with the ears 12 carried by the hollow metallic float 13 which is adapted for slidable movement on the filling tube 1, it being understood of course that the float is provided with a central opening or bore 14 as is clearly illustrated in Figure 1.

The float 13 is thus operatively associated with the valve 5 and when the milk in the receptacle 2 reaches a predetermined level, the valve 5 will cut off the further supply of the milk from the filling tube 1 into the receptacle. As the milk is discharged from the receptacle, the float 13 descends simultaneously causing the opening of the valve whereby a further supply of milk from the filling tube into the receptacle is had.

It will thus be seen from the foregoing description, that a simple and efficient device has been provided wherein the milk will be discharged into the supply receptacle in such a manner as to prevent the formation of foam therein thereby permitting the milk bottle to be readily and efficiently filled.

A device of the above character may also be used in connection with other fluids in addition to the bottling of milk.

While I have shown the preferred embodiment of my invention, it is to be understood that various changes in the size, shape and arrangement of parts may be resorted to without departing from the spirit of the invention and the scope of the appended claim.

Having thus described the invention, what I claim is:

A device of the class described including a fluid filling tube adapted to extend downwardly into a fluid receiving receptable, and restricted intermediate its ends adjacent its lower end so as to provide a valve seat, the lower end of the tube terminating adjacent the bottom of the receptacle and being provided with longitudinally extending slots starting at the edge of the lower end and disposed diametrically opposite to each other, a substantially U-shaped member having the base portion thereof extending transversely across the tube in the slots thereof, a valve supported on the base portion of the U-shaped member and extending into the lower end of the filling tube for cooperating with the valve seat formed therein, and a float secured to the upper ends of the U-shaped member and encircling the filling tube whereby the valve may be controlled by the fluid, as it fills the receptacle, for closing the valve against the seat in the tube.

In testimony whereof I affix my signature.

WILLIAM KOHR.